(12) United States Patent
Gordilov (10) Patent No.: US 11,383,244 B2
(45) Date of Patent: Jul. 12, 2022

(54) BREWER'S SPENT GRAIN GRINDER AND PRODUCTION LINE FOR PRODUCING PRODUCT WITH HIGH PROTEIN CONTENT

(71) Applicant: BioBo GmbH, Bad Berneck (DE)

(72) Inventor: Oleg Grigorievich Gordilov, Rostov-na-Donu (RU)

(73) Assignee: BioBo GmbH, Bad Berneck (DE)

( * ) Notice: Subject to any disclaimer, the term of this patent is extended or adjusted under 35 U.S.C. 154(b) by 0 days.

(21) Appl. No.: 17/527,471

(22) Filed: Nov. 16, 2021

(65) Prior Publication Data
US 2022/0152620 A1 May 19, 2022

Related U.S. Application Data

(63) Continuation of application No. PCT/RU2020/000123, filed on Mar. 6, 2020.

(30) Foreign Application Priority Data

Feb. 26, 2020 (RU) .................. 2020108317

(51) Int. Cl.
*B02C 7/08* (2006.01)
*B02C 15/08* (2006.01)
(Continued)

(52) U.S. Cl.
CPC ................ *B02C 15/08* (2013.01); *B02C 7/08* (2013.01); *B02C 7/13* (2013.01); *B02C 11/00* (2013.01);
(Continued)

(58) Field of Classification Search
CPC .. B02C 7/13; B02C 7/08; B02C 11/00; B02C 23/06
See application file for complete search history.

(56) References Cited

U.S. PATENT DOCUMENTS 1,556,927 A * 10/1925 Fritz .................. B02C 7/08
                                                                                            241/257.1
5,419,252 A *  5/1995 Satake ................ B02B 3/04
                                                                                              99/611
(Continued)

FOREIGN PATENT DOCUMENTS

CN          203281388 U       11/2013
CN          104383978 A        3/2015
(Continued)

OTHER PUBLICATIONS

Akhme Ivaliyev, "Analysis of process of division of suspensions and improvement of the vibration and centrifugal centrifuge", Agro-Industrial Complex of Russia, 2015, vol. 74, pp. 9-14.
(Continued)

*Primary Examiner* — Faye Francis
(74) *Attorney, Agent, or Firm* — BCF LLP (57) ABSTRACT

A brewer's spent grain (BSG) grinder includes a charging tank connected to a grinding unit, the charging tank being equipped with a device for BSG moistening, and the grinding unit having an outlet for discharging grinded BSG. The grinding unit includes a stator and a rotor located coaxially with a gap defined between their working surfaces. A device for mixing and moving a mixture into the gap is fixed on a central part of an upper side of the rotor. A device for discharging grinded BSG is located under the rotor. The rotor is configured to allow staged grinding of BSG to obtain coarser and finer fractions of BSG at upper and lower stages of the rotor respectively. An upper part of the rotor is equipped with blades located around a circumference of the rotor, an outer surface of each blade being part of the working surface of the rotor.

20 Claims, 6 Drawing Sheets

(51) Int. Cl.
  *B02C 23/06* (2006.01)
  *B02C 11/04* (2006.01)
  *B02C 25/00* (2006.01)
  *B02C 7/13* (2006.01)
  *B02C 11/00* (2006.01)
  *B02C 15/00* (2006.01)

(52) U.S. Cl.
  CPC .............. *B02C 11/04* (2013.01); *B02C 23/06* (2013.01); *B02C 25/00* (2013.01); *B02C 2015/002* (2013.01)

(56) References Cited

U.S. PATENT DOCUMENTS

| | | | | |
|---|---|---|---|---|
| 5,511,469 A | * | 4/1996 | Satake | ...................... B02B 3/04 99/519 |
| 5,752,664 A | * | 5/1998 | Satake | ...................... B02B 3/00 241/49 |
| 9,751,086 B2 | * | 9/2017 | Kajihara | .................. B02B 3/04 |
| 2011/0158931 A1 | | 6/2011 | Wittek | |
| 2018/0199593 A1 | | 7/2018 | Mackay et al. | |

FOREIGN PATENT DOCUMENTS

| | | |
|---|---|---|
| CN | 204816672 U | 12/2015 |
| CN | 106378237 A | 2/2017 |
| RU | 2335918 C2 | 10/2008 |

OTHER PUBLICATIONS

Nikolaev et al.,"A device for separation of brewer's draff in a liquid and thick fraction", Electronic Scientific-Practical journal, Actual issues of agrarian science, Published in Sep. 2018, edition 28, pp. 14-22.

Ika, "Inline dispersers / Mills", https://www.ikaprocess.com/ru/Products/Inline-dispersers-Mills-dispersing-machine-high-shear-cph-6/. Retrieved from the Internet on Sep. 23, 2021.

Ika, "Colloid Mill MK", https://www.ikaprocess.com/en/Products/Inline-dispersers-Mills-dispersing-machine-high-shear-ph-6/Colloid-Mill-MK-csb-MK/. Retrieved from the Interneton Sep. 23, 2021.

* cited by examiner

BREWER'S SPENT GRAIN GRINDER AND PRODUCTION LINE FOR PRODUCING PRODUCT WITH HIGH PROTEIN CONTENT

CROSS-REFERENCE

The present application is a continuation of PCT Patent Application No. PCT/RU2020/000123, filed Mar. 6, 2020, which claims priority from Russian Patent Application No. 2020108317, filed Feb. 26, 2020, the entirety of each of which is incorporated by reference herein.

FIELD OF TECHNOLOGY

The present technology pertains to devices designed for wet grinding of fibrous materials and solid granules, preferably with vertical charging, which can be used in the food industry, specifically, in processing of brewer's spent grain, which is the brewing waste, to obtain a protein product in the form of a suspension, flour, or concentrate for subsequent use in food products with therapeutic, prophylactic and dietary properties. The product of brewer's spent grain processing can also find application in animal husbandry as supplement feeds, in agriculture as soil fertilizer, etc.

BACKGROUND

These days, fine and ultrafine grinding (or crushing) of particles is important for various industries. Herewith, difficulties in solving this problem relate to ensuring fine grinding of the original material with inhomogeneous composition of components. Colloid mills are known from the prior art—the units for preparation of suspensions, emulsions, solutions in various fields of industry, specifically, in the food industry, allowing to produce a homogeneous product with the required fraction size. The sizes of particles obtained through crushing in colloid mills can have a wide range of values, from a few microns to mm, depending on the type of raw material.

The claimed unit is a grinder for brewer's spent grain grinding that allows obtaining a pasty-like mass (suspension or pulp) with the particle size (fractions) ranging from 0.001 mm to 5 mm. To avoid adhesion of particles, grinding is carried out with some dispersing medium added, for which any liquid, for example, water is used. The production (process) line is also claimed for obtaining the product with high protein content (suspension, flour, or concentrate) of brewer's spent grain by using the mill of the claimed design in its configuration.

The non-limiting embodiments of the present technology are directed to design improvement of a rotary colloid mill for wet grinding with vertical charging of raw material, concerning its grinding unit connected to the electric motor and the charging hopper. As a rule, design of the grinding unit of the mill includes a housing fitted with inlet and outlet nozzles, in which the operating elements—the rotor and the stator—are installed coaxially and with a gap allowing relative mutual rotation. In most of the known implementations, the mill contains a mechanism for adjustment of the gap between the operating elements. The operating elements are made of high-strength materials, the working surfaces have a complex relief formed by knives and grooves. The operation principle is based on abrasion (dispersion) of the original mixture components in the gap between the working surfaces of the rotor and the stator when one of them rotates. Colloid mills ensure high dispersion of suspensions and emulsions containing insoluble solid components.

Various modifications of colloid mills produced by IKA WERKE GMBH & CO KG [DE] (https://www.ikaprocess.com/ru/Products/Inline-dispersers-Mills-dispersing-machine-high-shear-cph-6/) are known from the prior art with the rotor-stator unit of original design that have certain pattern of the working surfaces of the rotor and the stator, certain taper of the rotor and the stator, as well as certain shape of the upper part of the rotor with a cavity and cut-out sections through which the original product enters the gap between the rotor and the stator. Herewith, the working surface of the rotor is made in a way that allows three-stage grinding of the original product to obtain coarser grain fraction at the first stage and finer grain fraction at the third stage (with decrease in width and increase in the number of grooves from the first stage to the third one), as a result of which particle grinding with reliably reproducible narrow distribution range is achieved.

Thus, a model of high-performance in-line colloid mill—IKA MK 2000 manufactured by IKA WERKE GMBH & CO KG [DE] (see https://www.ikaprocess.com/ru/Products/Inline-dispersers-Mills-dispersing-machine-high-shear-cph-6/Colloid-Mill-MK-csb-MK/) designed for wet fine grinding of hard and granular materials—is known from the prior art. This MK 2000 mill is capable of producing high quality colloid solutions as well as ultrafine emulsions and suspensions. The grinding unit in the mill is made in the form of a rotor-stator system with spiral or transverse cutting to various size on the working surface of the rotor and stator. Conical design of the coaxially located rotor and stator allows smooth adjustment of the gap between the stator and the rotor, when the latter moves in the axial direction. It allows influencing the dispersion results, especially when using inhomogeneous materials. Besides, as a rule, the known colloid mills are characterized by the water-cooling jacket available in the configuration.

All above-described properties of the colloid mill IKA MK allow achieving a particle size comparable to the particle size obtained after dispersion in the high-pressure homogenizer.

The known designs of the colloid mill have a characteristic rotor and stator shape—like a truncated cone, which, together with geometry of their working surfaces, ensures ultrafine grinding of particles. However, these designs are not optimal for grinding brewer's spent grain in order to obtain the product with high protein content. When grinding brewer's spent grain in these mills, a mass is obtained in which part of protein stays bound inside the pressed shell particles, which causes protein loss in the next technological cycle the resulting homogeneous product purification from shell residues. In addition, the known designs are characterized by relatively low productivity and insufficient reliability for this product; they do not ensure uninterrupted functioning of the mill during its operation due to the grinding unit clogging with particles of the crushed raw material. The described design also fails to allow possibility of humidifying the supplied raw material in automatic controlled mode to obtain a pasty-like mass required for brewer's spent grain grinding.

From patent CN204816672 a vertical colloid mill for dairy products is known with an electric motor located on its base and a grinding unit connected to the charging hopper. The grinding unit contains a stationary static element of the mill (stator), and a rotating grinding element (rotor) located on the motor shaft. A centrifugal disc is located on the bottom side of the rotor. The rotor and the stator are key parts of the mill, they have closely spaced tapered surfaces with gear slots (grooves) on them, which differ in their geometric characteristics and position on the tapered surfaces. In one of the grinding unit configurations, the working surfaces of the rotor and the stator are made with three grinding stages along the length of the rotor, each characterized by different geometry of the toothed slots—taper, length, depth. The rotor and the stator are made of stainless steel.

However, configuration of the grinding unit, the rotor and the stator in this colloid mill is selected for processing of dairy products with liquid or creamy consistency. The narrow cylinder-shaped extended vertical section between the charging hopper and the working area of the mill prevents free passage of products with insufficient moisture content. Besides, the use of sawtooth grooves (clots) as cutting edges of the rotor reduces the speed of large-sized product particles passage. Also, this colloid mill design is characterized by disadvantages described above for the mills manufactured by IKA WERKE GMBH & CO KG [DE].

From patent CN106378237 the colloid mill is known, in which the grinding unit consists of the three-stage static cone-shaped stator and the four-stage movable cone-shaped grinding rotor. The rotor is connected to the shaft of the high-speed electric motor, while the electric motor shaft is attached to the rotor with the nut. In the grinding unit, the gap between the first stage of the rotor and the top cover is 0.25-0.55 mm, the gap between the second stage of the rotor and the stator is 0.15-0.25 mm, the gap between the third stage of the rotor and the stator is 0.085-0.15 mm, the gap between the fourth stage of the rotor and the stator is 0.005 mm. The stator is a cone with the lateral surface angle of deflection of 8°. The first stage of the rotor has stepped taper and sawtooth grooves helically located at the certain angle of spiral inclination. The second stage of the rotor is made with 40 sawtooth grooves deflected by 9°; the third stage of the rotor has 160 zigzag grooves deflected by 12°; the fourth stage of the rotor is made of metal carbide or covered with ceramic coating.

However, the narrow cylinder-shaped extended vertical section in front of the working zone of the mill and the top conical part of the rotor at the upper level prevent free passage of products with insufficiently high moisture content or having coarse fractions. Furthermore, this design is also not optimal for brewer's spent grain grinding to obtain the product with high protein content, for which, at the output from the mill, a pasty-like mass must have coarser fraction sizes than those provided by the known design. Excessive grinding is not acceptable for further processing of the crushed spent grain in the separator. In addition, the use of a conventional nut for fastening the motor shaft to the rotor, which gets into the lower part of the hopper for the charged product, forms a compacted region during rotation in the product, which impedes passage of the product into the working area of the mill (the rotor and the stator). The use of sawtooth grooves as cutting edges of the rotor reduces the speed of coarse product particles passage. Besides, this design also fails to allow humidifying of the supplied raw material to obtain a pasty-like mass, required for brewer's spent grain grinding.

From among the above-described designs of colloid mills, the closest to the claimed solution is a high-performance in-line colloid mill—IKA MK 2000 manufactured by IKA WERKE GMBH & CO KG [DE] (see https://www.ikaprocess.com/ru/Products/Inline-dispersers-Mills-dispersing-machine-high-shear-cph-6/Colloid-Mill-MK-csb-MK/).

Thus, there are no technical solutions known from the prior art to have a set of design parameters that would ensure production of a product of the original brewer's spent grain, being the brewery waste, in the form of a pasty-like mass (pulp or suspension) with the remains of barley shell, grain particles saturated with proteins and fats, from which after shell separation the protein suspension is made with high protein content (at least 45.0-50.0 wt. % in dry matter), which can be widely used as food additive and supplement feed.

A technical problem consists in development of a rotary mill design with vertical charging of raw material, free of disadvantages of the above-described analogs with capability of obtaining the product with high protein content of brewer's spent grain.

SUMMARY

The technical result of the non-limiting embodiments of the present technology is development of a high-performance and reliable device for grinding of brewer's spent grain (brewer's spent grain being the brewery waste) to produce a product in the form of a pasty-like mass (pulp or suspension), which, after shell separation (when obtaining a protein suspension, flour or concentrate) is characterized by high protein content.

The claimed grinder and the production line, in which it is installed, can be implemented with different capacities—from several units to several dozens of tons of product per hour. Herewith, reliability of the grinder design is ensured, among other things, by continuous uninterrupted mode of its operation for a long time, owing to prevention of the crushing unit clogging with particles of grinded raw material. The particles contained in the pasty-like mass at the output from the mill can have the size of 0.001 mm to 5 mm.

The technical result is ensured by creating a brewer's spent grain grinder (alternatively referred to as a mill) that includes a charging tank connected to a grinding unit, where the charging tank is equipped with a device for brewer's spent grain moistening, and the grinding unit has an outlet for charging the grinded brewer's spent grain out, and contains the coaxially positioned stator and rotor with a gap between their working surfaces; a device for mixing (or adding liquid to brewer's spent grain) and moving the mixture into the gap between the stator and the rotor, fixed on the side of the upper end surface of the rotor in its central part; a device, for example in the form of a bladed disc, for charging the grinded brewer's spent grain out, located under the rotor; herewith, the rotor is made with capability of stepwise brewer's spent grain grinding to obtain a coarser fraction of grain at the upper stage, a finer fraction of grain at the lower stage, and in the upper part it is equipped with blades located around the circumference of the rotor, the outer surface of which is part of the working surface of the rotor.

In one of the non-limiting embodiments, the stator is stationary and the rotor is movable. In this option, the stator and the rotor can be made in the form of truncated cones in the longitudinal cross-section plane.

Preferably, the rotor is made with capability of three-stage brewer's spent grain grinding.

The blades, located on the upper end surface of the rotor, have a bevel from the outer surface at one end, and a bevel from the inner surface at the other end, that ensure flow of brewer's spent grain into the gap between the rotor and the stator. The preferable option is opposite arrangement of these blades.

The working surface of the rotor stages is made with decrease in width and increase in the number of grooves from the upper stage to the lower one.

A device for brewers' spent grain moistening in one of the configuration options is a circular pipeline located in the upper part of the charging tank with holes or nozzles for liquid feeding. The device for brewers' spent grain moistening can be configured to monitor and control the amount of the liquid being fed.

A device for mixing (brewers' spent grain with liquid) and moving the mixture into the gap between the stator and the rotor can be made in the form of V-shaped or Y-shaped blade. Herewith, this blade is located in a cavity from the side of the inlet into the grinding unit, limited on the lower side by the end surface of the rotor, so that it can occupy up to half the height of this cavity in height.

The charging tank can be equipped with sensors for the brewer's spent grain charging level, which can be connected to the controller to control feeding of the original spent grain to the charging tank.

The grinding unit is preferably configured to grind brewer's spent grain to the particle size of 0.001-5 mm.

A device for charging the grinded brewer's spent grain out is made in the form of a bladed disk located on the rotor axis.

The outlet for charging the grinded brewer's spent grain out of the grinding unit has a hole width equal to 8-10% of the circumference of the outer diameter of the stator.

The technical result is provided by creating an apparatus for producing a protein suspension of brewer's spent grain, that consists of the following devices, connected in a technological sequence: a device for loosening brewer's spent grain and removing mechanical impurities from it; a brewer's spent grain grinder (mill), the design of which is described above; an extractor made with capability of separating the mass into a suspension and shell; a vibration filter capable of separating the remaining shell particles from the resulting suspension.

The brewer's spent grain grinder is made with capability of grinding the mass to the particle size of 0.001-5 mm. The extractor is designed to extract (separate) the mass with the particle size of 0.001-1.0 mm from larger particles. The vibration filter is made with the filter mesh size of 0.1-0.5 mm. The vibration screen with magnetic trap can be used as the device for loosening and removing mechanical impurities. The vibration screen is made with the mesh size of 6-10 mm, the vibration frequency from 10 to 50 Hz, and the amplitude of 2-20 mm.

The production line can further comprise a protein suspension concentration unit having concentrate and centrate outlets. Herewith, the centrate outlet for the of the protein suspension concentration unit can be connected to the brewer's spent grain grinder with capability of moistening it before grinding.

The claimed device (mill) provides additional moistening of raw material in the charging tank and the appropriate grinding parameters, and the product processed in this device contains particles ranging in size from 0.001 to 5 mm. The product obtained at the outlet from the mill is optimally separated in the separator into food and non-food fractions. Excessive grinding of brewer's spent grain (resulting in particles less than 0.001 mm) converts the spent grain into a homogeneous mass, that prevents it from being efficiently separated into shell and the suspension with high protein content.

Apart from that, the claimed design of the mill anticipates no need for a water-cooling jacket owing to the use of a liquid feeding device (temperature of which can range from 3 to 30° C.) for the original raw material moisturizing, which, during the mill operation, ensures its continuous/intermittent cooling. The absence of the water-cooling jacket simplifies the mill design in comparison with the known analogs.

The advantage of the developed mill design consists in production of a grinded product, in which part of protein stays unbound inside the pressed shell particles, preventing protein loss in the next technological cycle of the resulting homogeneous product purification from the shell residues.

The claimed device is characterized by high grinding intensity, as well as reliable, efficient and long-term operation.

BRIEF DESCRIPTION OF DRAWINGS

The present technology is described using the illustrative materials, where

FIGS. 13-15 show pictures of individual structural parts of a prototype mill, where

The figures contain the items indicated as follows:
1—mill,
2—grinding (crushing) unit,
3—charging tank,
4—housing of the grinding unit 2,
5—stator,
6—rotor,
7—electric motor,
8—rotor shaft 6 (connected to the electric motor shaft, for example, by a belt drive or by a gearbox),
9—base (or frame) for placing the electric motor 7 and the mill 1,
10—gap between the stator 5 and the rotor 6,
11—cavity from the inlet side to the grinding unit,
12—Y-shaped or V-shaped blade,
13—circular water pipeline, 14—holes (or nozzles) in the pipeline for water or centrate feeding,
15, 16, 17—level sensors,
18—water feeding control valve,
19, 20, 21—cutting edges of the blade 12,
22—screw on which the blade 12 is fixed,
23—first (upper) stage of the rotor 6,
24—second stage of the rotor 6,
25—third (lower) stage of the rotor 6,
26—cavity in the upper part of the rotor 6,
27—walls (blades) of the rotor limiting the cavity 26,
28—disc with blades for moving the crushed product to the outlet,
29—inlet of the grinding unit,
30—outlet of the grinding unit,
31—vibration screen,
32—conveyor,
33—screw extractor,
34, 36—impeller pump,
35—vibration filter,
37—accumulation tank for the protein suspension,
38—accumulation tank for shell,
39—block for the protein suspension processing to obtain the protein concentrate or the protein isolate,
40—tank for the centrate.

DETAILED DESCRIPTION

Below is a more detailed description of non-limiting embodiments of the present technology, which does not limit the scope of the claims, but demonstrates the possibility of their implementation with achievement of the technical result. Herewith, the non-limiting embodiments of the present technology demonstrate the possibility of using the grinder (FIGS. 1-15) as part of the production line (FIG. 16) for brewer's spent grain processing to produce the high-protein suspension.

The mill 1, which can alternatively be referred to as a grinder 1, is configured to allow uniform moistening of raw material (brewer's spent grain—referred to in shorthand as BSG) throughout the entire volume, crushing of its components (remains of barley shell, grain particles saturated with protein and fat, etc.) to the fraction size ranging from 0.001 mm to 5 mm, and homogenization. The mill includes the grinding (crushing) unit 2 connected to the charging tank (charging hopper) 3. The grinding unit contains the operating elements coaxially installed in the housing 4 (the stator 5 and the rotor 6) made with the cylindrical or conical working surface in the longitudinal cross-section. The stator and/or the rotor rotate around their common axis. In case of stationary installation of one of the operating elements, the apparatus has simpler technological design. In one of the non-limiting embodiments, a rotating operating element—the rotor, and a stationary one—a stator, are used. The operating elements in a non-limiting embodiment of the mill are of conical shape. The rotor 6 is fixed on the shaft 8, which is connected to the shaft of the electric motor 7 by any means known from the prior art, for example, by means of a belt drive or by means of a gearbox. The mill 1 and the electric motor 7 can be placed on the same base.

The rotor 6 in the housing 4 is installed with the gap 10 relative to the stator 5 between their working surfaces, in which the supplied material is crushed to the size ranging from 0.5 to 2.5 mm, that can be adjusted, for example, by the reciprocating movement of the rotor (in case the operating elements have the form of truncated cones). Herewith, it is preferable to make the rotor and the stator and install them relative to each other with increase in the gap from the third (lower) stage of the rotor to the first (upper) stage.

The support disk 28 with the blades shaped to ensure that, when the disk rotates, the crushed product moves to the outlet 29, is also installed on the shaft of the rotor 6.

Below is a more detailed description of the individual parts and structural elements of the mill.

Figure 1:
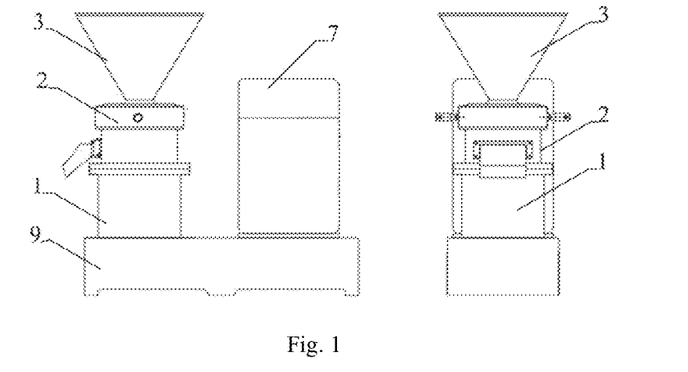
FIG. 1 shows an overall view of the claimed mill installed on the base together with an electric motor—front and side views.
Figure 2:
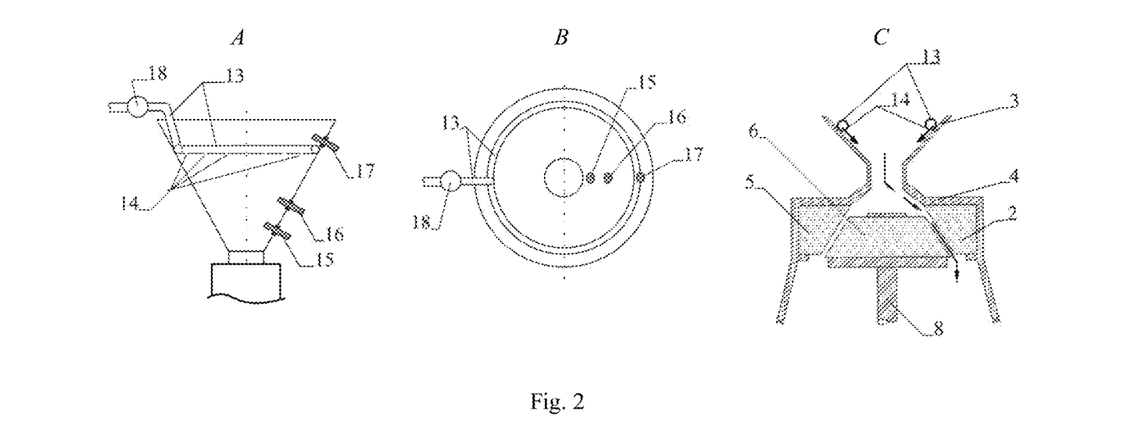
FIG. 2 shows an overall view of the mill charging tank: A—a layout of structural elements in the charging tank, B—a top view of the charging tank, C—an overall view of the mill showing the process of the original product charging and processing.
Figure 3:
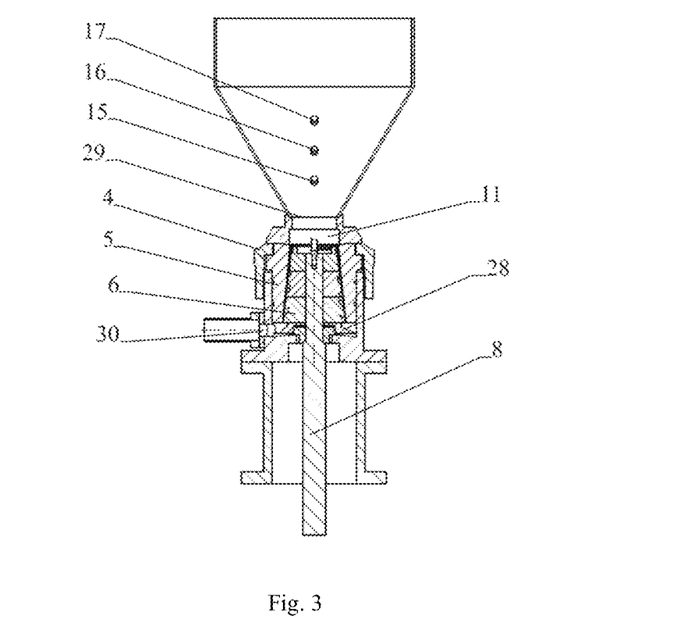
FIG. 3 shows a longitudinal cross-section of the mill.
Figure 4:
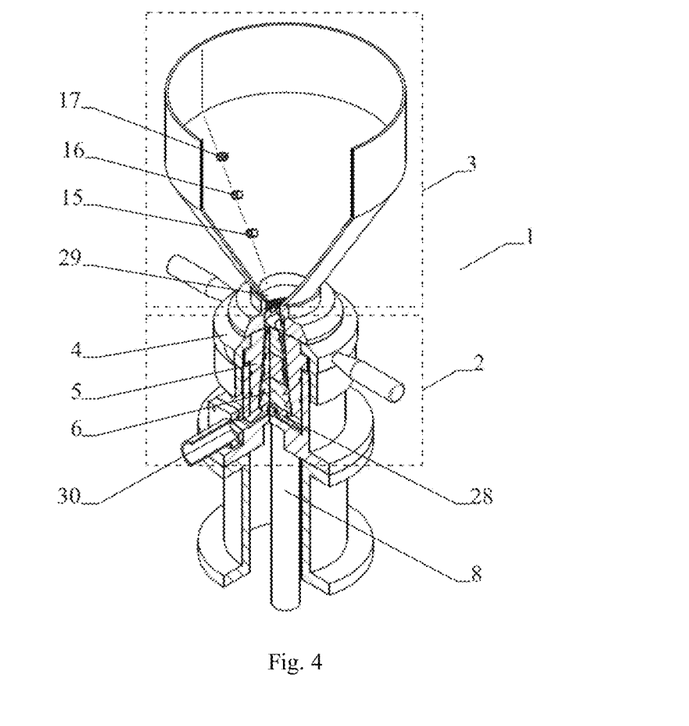
FIG. 4 shows a general view of the mill with a cut-out fragment for visualizing individual structural elements located in the mill housing.

The charging tank 3 is preferably made in the funnel form (FIG. 1, 2). Herewith, the mill is equipped with the liquid feeding device for raw material moisturizing. To ensure uniform wetting of raw material, this device can be made in the form of the water pipeline 13 with holes or nozzles 14 located around the circumference of the tank 3 in its upper part above the mark for the maximal raw material charging to the tank. In a non-limiting embodiment of the present technology, the holes 14 in the pipeline are evenly distributed along its length, which ensures uniform brewer's spent grain moistening (dilution) throughout the entire volume during processing. The charging tank 3 is fitted with level sensors 15, 16 and 17 (FIG. 2), which provide control of the process of raw material and water charging into the mill 1. The preferable option anticipates installation of three level sensors 15, 16 and 17 in the charging tank with their connection to a microcontroller, that can be located in the immediate vicinity of the level sensors, for example, on the base (frame) on which the mill is installed. Herewith, one of the sensors—the upper one 17—is designed to control the maximal possible level of raw material charging (for example, 85-90 vol. % of the maximal capacity of the charging tank); the second sensor—the middle one 16—is designed to control the optimal level of the charged raw material (for example, 25-30 vol. % of the maximal capacity of the charging tank); the third sensor—the lower one 15—is installed at the bottom of the charging hopper, at the distance of 15 cm from the bottom, to control the minimal possible amount of raw material in the hopper (for example, 10-15 vol. % of the maximal capacity of the hopper). When the charged raw material reaches the level below the location level of this sensor 15, operation of the mill interrupts until the next batch of raw material arrives.

Figure 7:
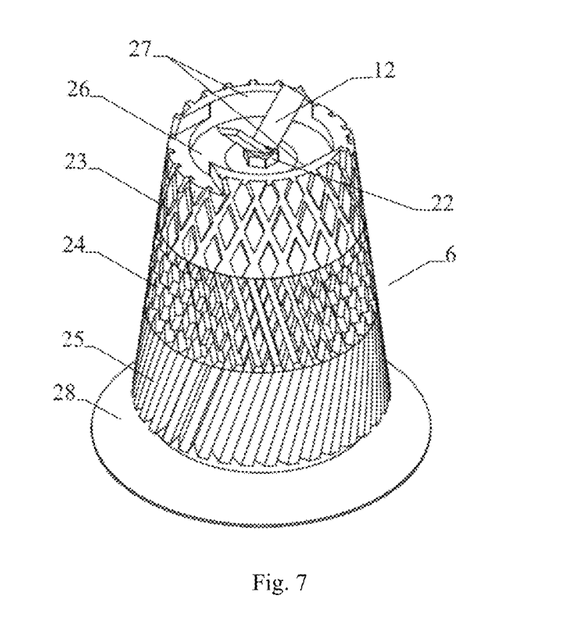

The rotor 6 in the grinding unit 2 of the mill 1, fixed on the shaft 8, is of original design with the multi-stage working surface and the cavity 26 in the upper part of the rotor 6, in which V-shaped or Y-shaped blade 12 is located, fixed on the side of the end surface of the shaft 8. The optimal option is to make the working surface of the rotor three-staged—to ensure three-stage grinding of brewer's spent grain to obtain the coarser fraction at the first stage and the finer one at the third stage. With this purpose, the outer (working) surface of each stage of the rotor has a relief formed by knives and grooves located between the knives, that provides required grinding of the original product. In this case, the distance between adjacent knives decreases from the first stage to the third one, as shown in FIG. 7.

Figure 8:
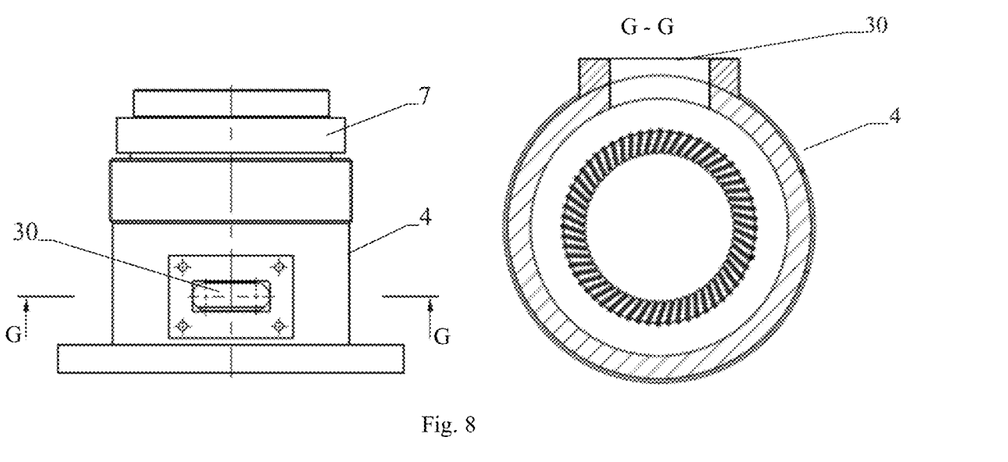
FIG. 8 shows a side view and a cross-section in the plane of the outlet for charging the grinded product out (G-G)
Figure 9:
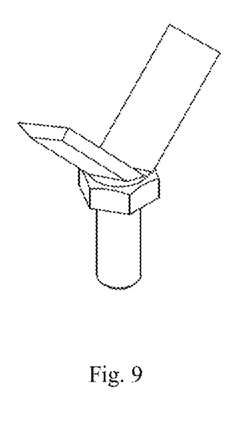
FIGS. 9-12 show one of the possible options of V-shaped blade located in the upper part of the rotor; a general view, a front view, a side view and a top view, respectively.
Figure 10:
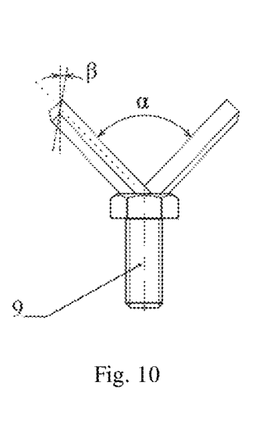
Figure 11:
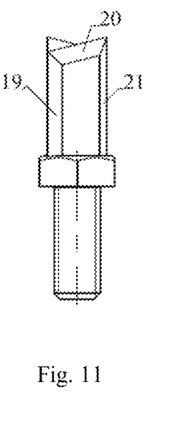
Figure 12:
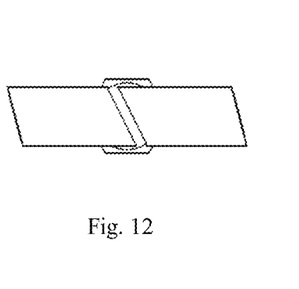
Figure 13:
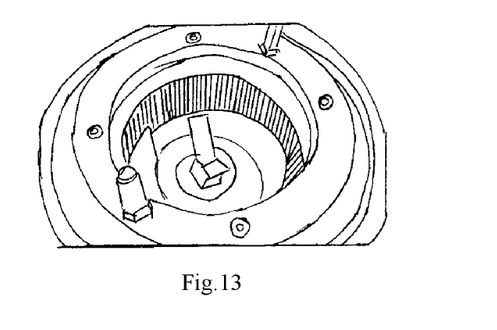
FIG. 13 shows a top view of the grinding unit (with the charging hopper removed)

In one of the configuration options, the rotor 6 can be of the height equal to or less than the height of the stator 5, while the stages of the rotor 6 can also be made equal or different in height. The geometrical dimensions of the rotor and stator (height, diameter) are determined by the mill capacity. In the described mill configuration with the rotor height of 120 mm, the stages 23 to 25 of the rotor 6 are made with the same height of 40 mm. The working surface of the first stage 23 is formed by intersecting "knives" (in the form of protrusions), located at the angle to the generatrix of the cone of this stage, for example, 15°-45°, with the distance from each other (pitch) ranging from 3 to 6 mm, which in aggregate form the surface preferably composed of rhombuses, as shown in FIG. 8. The pattern of the working surface of the second stage 24 on the rotor 6 can be similar to the pattern of the first stage with decrease in the distance (pitch) between adjacent knives, for example, by ½-⅓ of the first stage pitch. The working surface of the third stage 25 can be formed by knives located nearly parallel over the entire surface at the angle to the generatrix of, for example, 15°-50° with the distance from each other (pitch) similar to the distance (pitch) between adjacent (parallel) knives of the second stage, or less, for example, ½-⅓. This rotor geometry was determined for the mill with the capacity of 1.5-2 tons per hour. However, a different design of the rotor, its stages and the working surface with arrangement of knives is possible, which jointly provide the required degree of grinding of the brewer's spent grain particles. The rotor can be made in the form of a single piece, or it can consist of separate parts—stages.

The charging tank 3 is connected to the grinding unit 2 with forming of "transition" cavity in the upper part of the latter from the lower surface of the tank 1 to the upper end surface of the rotor 6 (its first stage), in which V-shaped blade 12 is located. Herewith, a cut-out (cavity 26) is made in the rotor 6 in its upper part, bounded by two walls 27 located around the circumference of the rotor opposite each other (equidistant from each other), which perform the function of blades pressing brewer's spent grain to the walls of the stator 5 that further gets into the gap 10 between the stator and the rotor. With this purpose, each wall (blade) has a bevel from the outer surface at one end, and a bevel from the inner surface at the other end. Herewith, the outer surface of the blades 27 is part of the outer (working) surface of the first stage 23 of the rotor. The length (dimension) of the blade, measured around the circumference, in one of the configuration options of the rotor can be ¼ of the circumference. It is also possible to make the blades smaller in length (for example, from ¼ to ⅙ of the circumference) with increase in the distance (clearance) between the blades around the circumference, through which the original brewer's spent grain get into the gap 10.

The working surface of the stator 7 (FIG. 6) is also made corrugated—formed by knives and grooves (or protrusions and depressions), preferably longitudinally oriented, with small angle of deflection to the generatrix of the stator, for example, from 5° to 30°.

A Y-shaped or V-shaped blade 12 is rigidly fixed in the center of the rotor 6 in the cavity 26 on the end surface of the shaft 8, which, together with the blades 27, improves brewer's spent grain passing through the mill, thus increasing its capacity. In the described non-limiting embodiment, as shown in FIGS. 9-12, the V-shaped blade 12 is made, for example, of one plate bent at the angle α from 35° to 55° and fitted with cutting edges (sharpened) 19-21, where the edge 19 is located in the direction of the blade rotation with the angle of attack of 12-15%. Preferably, in the sweep, the blade has the shape of a parallelogram with the acute angle of 35° to 55°. This blade contributes to the forced "suction" of brewer's spent grain into the gap between the stator and the rotor with associated preliminary loosening (grinding) of the charged raw material (brewer's spent grain). In one of the configuration options of V-shaped blade 12, its elements—two blades—can be located with rotation around their own longitudinal axes (passing through their middle) at the angle β from 5° to 45° along the course (in the direction) of the blade rotation, which allows improving the "capture" and supply of brewer's spent grain from the cavity of the upper part of the rotor into the gap 10. In one of the configuration options, this blade can be welded to the screw head that fixes it rigidly to the body of the shaft 8.

Figure 14:
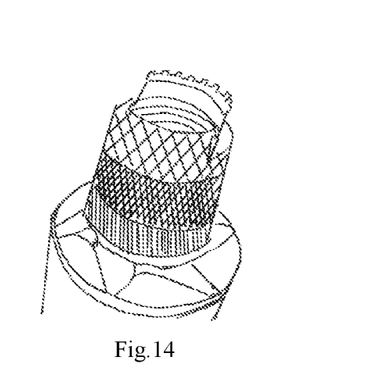
FIG. 14 and FIG. 15 show general views of the rotor located on the disc for moving the grinded product to the outlet.
Figure 15:
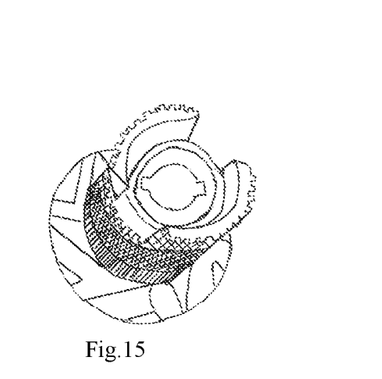
Figure 16:
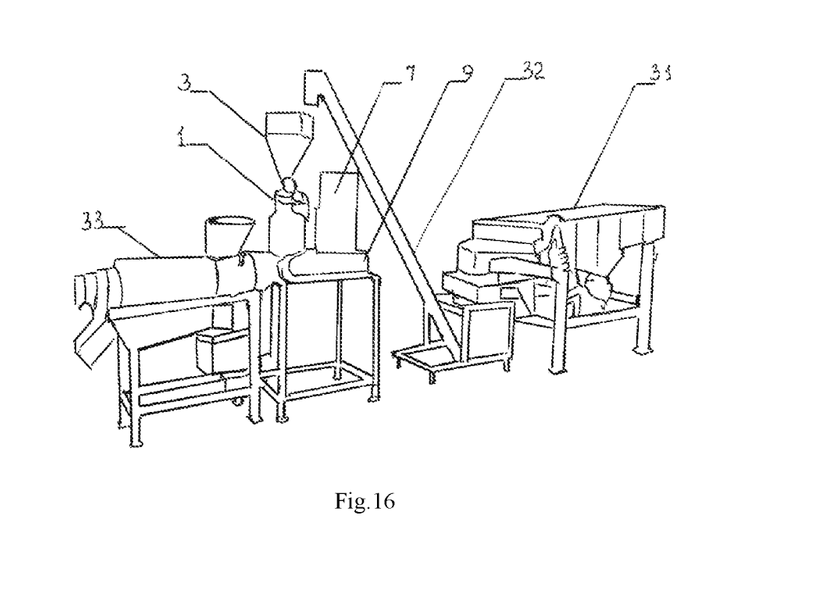
FIG. 16 shows a picture of a prototype production line (fragment) for making a protein suspension of brewer's spent grain, including the claimed mill.

There is also the disk 27 with blades 28, located on the shaft 8 under the rotor 6, designed for moving the grinded brewer's spent grain to the outlet of the grinding unit, which may be of the shape shown in FIGS. 14 and 15.

In a non-limiting embodiment, the outlet 30 for the finished product can be expanded by 20-30%, compared with the known designs (FIG. 8). In one of the non-limiting embodiments, the height of the outlet can be limited by the lower surface of the rotor 6 (its lower stage) and the lower surface of the disc 28 (i.e., be approximately equal in height to the height of the disc 28, which moves the grinded product to the outlet), and the width can be limited to 8-10% of the stator outer diameter circumference. Since the original product has high viscosity and numerous inclusions of granular material, expansion of the outlet opening size ensures free outflow of the suspension, eliminating the pressure increase in the housing due to the grinded product lagging at the outlet, which prevents the material from being fed into the working zone of the grinding unit.

The claimed mill can be used as part of the apparatus for producing various protein products of brewer's spent grain in the form of a suspension as an independent product and the preliminary raw material for obtaining a concentrate, isolate, flour, etc. that require the grinding of the original brewer's spent grain during its processing to obtain intermediate fractions (at the outlet from the mill) ranging from 0.001 mm to 5 mm.

Figure 17:
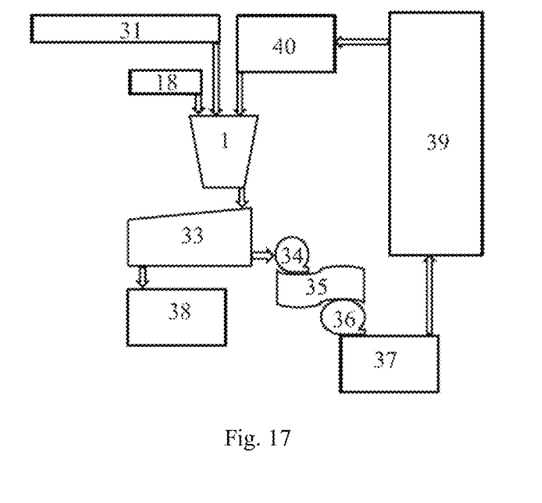
FIG. 17 shows a diagram for implementation of a prototype production line for producing protein flour of brewer's spent grain, including the claimed mill.

The production line for producing a protein suspension of brewer's spent grain (FIGS. 16, 17), includes the following devices connected in a technological sequence: a device for loosening and removing mechanical impurities—a vibration screen 31 connected to a conveyor 32; a mill 1 of the claimed design with an electric motor 7; an extractor 33 configured to separate (extract) a mass with the particle size of 0.001-1.0 mm from larger particles (separating it into a suspension and shell); a vibration filter 35 with the filter mesh size of 0.2-0.5 mm capable of additional separation of the remaining shell particles from the resulting suspension; accumulation tanks for the protein suspension 37 and shell 38. Herewith, a vibration screen with magnetic trap, the mesh size of 6-10 mm, the vibration frequency of 10 to 50 Hz, and the amplitude of 2-20 mm can be used as a device for loosening and removing mechanical inclusions. A screw extractor with the screw rotation velocity ranging from 2 rpm to 8 rpm is used as an extractor. Additionally, the production line can contain the protein suspension concentration unit 39 fitted with an outlet for the centrate, which can be connected to the pipeline 13 to moisturize raw material supplied to the mill 1.

The mill can be made of food grade stainless steel. The mill operation cycle looks as follows.

An electric motor 7 is turned on, which drives the shaft 8 into rotation, and, accordingly, the rotor 6 with V-shaped blade 12 and the disk 28 placed on it. Moistened brewer's spent grain is fed through the charging tank 1 to the grinding unit 2 (by the devices for feeding liquid—water or centrate), where in the gap between the rotor 6 and the stator 5, the spent grain particles are crushed. In the process of grinding, centrifugal forces move the material to the periphery, from where by means of the disc 28 it is charged out through the outlet 30 into the accumulation tank for the crushed material.

Below, the possibility of using the mill as part of the apparatus for producing the protein suspension of brewer's spent grain.

The original brewer's spent grain with the moisture content of 70-90% is processed on the mill 1 usually within 3 hours after its receipt (from the moment of its generation as beer production waste). The spent grain is charged manually or by any mechanical means onto the vibration screen 31 with the mesh size of 6-10 mm, equipped with the magnetic trap that is designed for brewer's spent grain loosening and removal of mechanical and metal impurities. Processing on the vibration screen 31 consists in grain screening with the screen vibration frequency of 10 to 50 Hz and the amplitude of 2-20 mm for 2-10 seconds to obtain lump-free raw material and ensure homogeneous composition for the next processing stage of material crushing. Loosening of brewer's spent grain to obtain the homogeneous mass with removal of mechanical inclusions, apart from the vibration screen, can be implemented by any other device or set of devices known from the prior art that have the listed functions. Next, for crushing, the loosened brewer's spent grain is fed with the conveyor 32 to the mill 1 installed jointly with the electric motor 7 on the base 9, that ensures crushing of the original spent grain to the fraction size of 0.001-5.0 mm. Herewith, in the process of raw material charging into the charging tank of the mill, water is gradually added to ensure uniform raw material moistening throughout the entire volume, either in continuous or pulsating modes. The amount of water fed usually ranges from 0.5:1 to 1:1 by weight with respect to brewer's spent grain. The moisture content of brewer's spent grain processed in the mill should preferably be in the range of 90-95%. In the mill 1, it is uniformly mixed (and/or homogenized) until a pasty-like homogeneous mass is obtained—a pulp with the preferable viscosity of 750-1400 SPa·s, which then flows by gravity into the screw extractor 33, where the mass is separated into the suspension with the moisture content of 90-95% and the viscosity of 1.5-3 SPa·s and the shell with the moisture content of 60-75%. Grain feeding into the mill can be carried out by any means known from the prior art, for example, using a screw, belt or scraper conveyor.

Grinding of brewer's spent grain in the mill 1 is carried out between the working surfaces of the rotor 6 and the stator 5, for example, when the rotor 6 of the mill rotates with the velocity of 1800-3200 rpm, which provides thick, homogeneous, but fluid consistency of the pulp for maximal recovery of nutritional fraction from the initial raw material at the screw extraction stage. The centrate obtained during subsequent processing of the food suspension (when it is concentrated) is preferably used for feeding into the mill 1 instead of water, which ensures more complete extraction of the nutrient fraction remaining in the centrate, and also eliminates the need to dispose of centrate, saving the resources required in case of the centrate disposal for cleaning before draining into sewage. Water or centrate from the units is fed into the funnel-shaped loading container 3 of the mill 1 through the holes 14 of the water pipeline 13 located around the circumference of the container in its upper part above the mark for the maximal tank charging with raw materials. The amount of water or centrate being fed can be controlled using the valve 18.

After grinding in the mill 1, the pulp is processed in the screw extractor 33 at the screw rotation velocity ranging from 2 rpm to 8 rpm, which allows the food suspension to be separated from the by-product, barley shell, as quickly as possible, within 1-2 seconds. For that purpose, the pasty-like mass (pulp) produced by the mill 1 flows by gravity into the screw extractor 33, where it is separated from shell to obtain the food suspension at the outlet with the moisture content of no more than 95%, and the by-product, barley shell, with the moisture content of 60-75% and the shell particle size ranging from 1.0 mm to 5.0 mm. Since after processing the suspension in the screw extractor 33, it still contains 2-5% of fine shell with size ranging from 0.01 to 1.0 mm, the suspension is transferred by the impeller or other pump 34, designed for food suspension with the up to 5% degree of contamination with small plant fractions of no more than 1.0 mm in size, to the next cleaning stage into the vibration filter 35 with the mesh size of 0.2-0.5 mm, which allows almost complete removal of remaining shell from the food suspension, generated in the screw extraction stage. After the vibration filter 35, the impeller pump 36 transfers the suspension into the accumulation tank 39. The generated protein suspension containing 40-65 wt. % of protein in dry matter can act as a final product that can be used as the food additive or supplementary feed, and can also be frozen for later use. The obtained protein suspension can be sent for further processing to the unit 39 in order to obtain from it the protein concentrate with protein content of 60-80 wt. % or the protein isolate with protein content of more than 80 wt. %.

Shell is a by-product of brewer's spent grain processing and, during operation of the screw extractor, it spontaneously pours into the accumulation hopper, from which it is transferred to the accumulation tank 38 by the screw, helical or other conveyor. The claimed production line can be used to obtain the protein suspension with lower protein content, for example, 40, 42, 47 and 49 wt. % (with lower energy value). Such a product can find application in areas where there are no requirements to achieve the maximal possible quantitative protein content in the protein product, for example, as supplementary feeds for animals.

Figure 5:
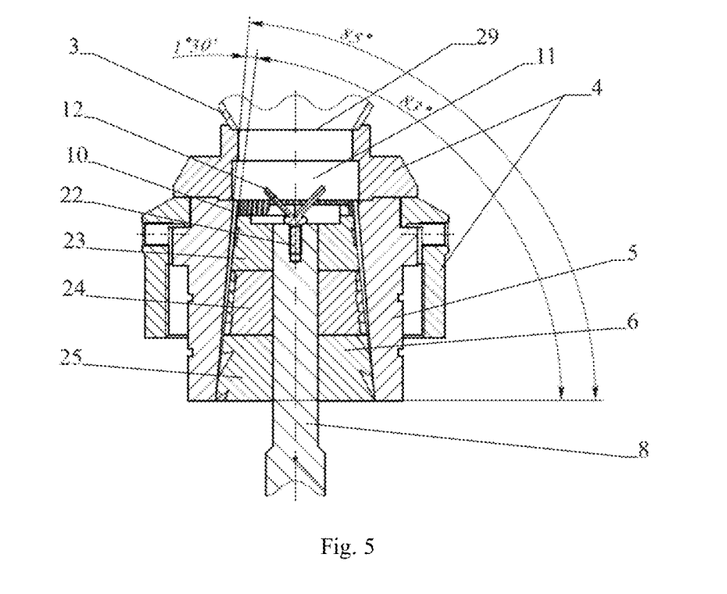
FIG. 5 shows a longitudinal cross-section of the mill in one of its possible configuration options with indication of the possible size of the gap between the rotor and the stator.
Figure 6:
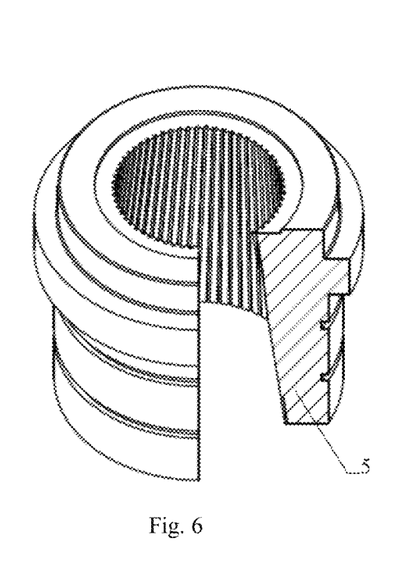
FIGS. 6 and 7 show general views of the stator and the rotor, respectively, with the example of possible relief on their working surfaces.

To demonstrate the possibility of implementing the non-limiting embodiments of the present technology, a mill of the claimed design and a production line in which this mill with the power of 11 kW, the rotor speed of 2200 rpm, with the dimensions of 1200×940×530 mm and the capacity of 1500 kg of brewer's spent grain per hour were made. The rotor and the stator of the mill were constructed as shown in FIG. 6, 7, and had the following parameters: the rotor height—120 mm; the height of individual rotor stages—40 mm; the diameter of the rotor base (lower stage)—120 mm; the top stage—100 mm; the height and diameter of the stator base—120 and 220 mm; the size of the "working gap between the rotor and the stator at the base and in the upper part—0.8 and 1.2 mm; the relief of the working surfaces of the rotor and stator was determined by the following parameters: the rhombus-shaped pattern of the upper stage of the rotor was determined by the size of the long diagonal of the rhombus 10 mm, the width of the rhombus (short diagonal)—5 mm, the rhombus-shaped pattern of the second (middle) stage of the rotor was determined by the size of the long diagonal of the rhombus—5 mm, the short one—2.5 mm, the distance between adjacent knives of the third (lower) stage of the rotor was 2 mm, while the width and height of the knives (projections forming the knives) at all stages was 2-2.5 mm; V-shaped blade had the following dimensions: length—50 mm, width—15 mm, thickness—2 mm, the angle between the blades—45° degrees, the angle of attack of the blade—12°; the dimensions of the outlet—65×45 mm (width×height), inlet in the housing—130 mm. Angle of deflection of the rotor generatrix to the horizontal line in the longitudinal cross-section of the grinding unit was 83° degrees, of the stator—85° degrees (FIG. 5). The charging tank 3 was made with the volume of 0.15 m³ and was equipped with the drinking water feeding device.

The resulting plant processed 260 kg of brewer's spent grain with the moisture content of 75.59% (energy value 150 kcal), for which the vibrating table XFZ1020 with a single-level screen having the mesh size of 10 mm, the table length of 2000 mm, the table width of 1000 mm, the vibration frequency of 20 Hz, the amplitude vibration of 8 mm, was used. From the vibration screen 31, the mass was fed by the belt conveyor 32 to the mill 1, where brewer's spent grain was moistened with water, the calculated amount of which was 170 liters (0.67:1), and which entered the mill at the velocity of 15 liters per minute, while the moistened brewer's spent grain was crushed to the fraction size of 0.1-1.0 mm. Control over the process of raw material and water feeding into the charging tank 3 of the mill 1 was carried out using three level sensors 15, 16 and 17 built into the body of the charging tank 3 and the microcontroller located in the immediate vicinity of the level sensors. Herewith, one of the sensors—the upper one 17—was used to control the maximal possible level of raw material charging into the hopper, upon reaching which the command was given to stop the charging conveyor; the second sensor—the middle one 16—was used to control the minimal level of the charged raw material (25-30 vol. % of the maximal capacity of the hopper), upon reaching which a command was given to turn on the charging conveyor and feed raw material into the charging hopper, which ensured continuous operation of the mill. The third sensor—the lower one 15—was installed at the bottom of the charging hopper, at the distance of 15 cm from the bottom, to control the minimal possible amount of raw material in the hopper, below which operation of the mill stops until the next raw material batch. After the mill, the resulting pulp with the viscosity of 900-1200 cPoise and the moisture content of 95% entered the screw extractor 35, for which the device KDLZ-1.5 with the power of 4 kW and the rotation frequency of 4.5-10 rpm was used, at the output from which the main product—the food suspension with the moisture content of 95%, the viscosity of 2.013 cPoise—as well as the by-product—barley shell with the moisture content of 70.84%—were obtained. The food suspension by means of the impeller pump 34 with the power of 0.25 kW and the rotation velocity of 1200 rpm was fed to the vibration filter 35 of XZS-1200-1S brand with the power of 0.75 kW and the mesh size of 0.3 mm and, after filtration, by means of the impeller pump 36 with the power of 0.25 kW and the rotation velocity of 1200 rpm was pumped into the storage tank 37. Shell spontaneously poured into the accumulation tank 38. Thus, the food suspension was obtained with the moisture content of 93%, the viscosity of 1.907 cPoise and the particle size of up to 0.005-0.3 mm. To evaluate the composition, 12 liters of milk were dried in the spray dryer HT-RY1500 for 8 hours at 200° C. to the moisture content of 10% (the spray drying HT-RY1500 capacity is 1500 mL of suspension per hour).

The mill and the production line that uses it provide for obtaining of a product of brewer's spent grain processing in the form of the food suspension with the protein content of at least 40 wt. % in dry matter with the food energy value of 220±50 kcal. The suspension can be a ready-to-drink product or an intermediate product from which a concentrate, isolate or flour with the protein content of up to 90-95 wt. % in dry matter can be obtained during further processing.

Processing of brewer's spent grain on the claimed design mill allows obtaining the gluten-free protein product with the moisture content of no more than 95% and the particle size of no more than 5 mm, the protein content of at least 40.0 wt. % in dry matter residue. When producing the protein suspension, the mill allows preserving all valuable biologically active components of the original brewer's spent grain to the maximum. The rich chemical composition of brewer's spent grain with the minimal content of carbohydrates predetermines the prospects for its use in the food industry, specifically in production of bakery confectionery products, as the protein-mineral-vitamin supplement.

When conducting tests for obtaining the protein product on known designs of the mills with the rotor-stator grinding unit, which were used as colloidal mills without any device for raw material moisturizing or mixing and moving device, the quantitative protein content in the finished product was significantly lower than in the claimed designs. The test results are given in the table below.

TABLE

| Characteristics of the grinder and the resulting product | Parameter values | |
|---|---|---|
| | Mill 1 (claimed) | Mill 2 (known) |
| Mill capacity when processing brewer's spent grain, kg/h | 1500 | 150 |
| particle size at the outlet from the mill, mm | 0.001-5 | 0.001-0.1 |
| Humidity content, % | 90-92 | 86 |
| Protein, % | 52.0 | 27.0 |

The invention claimed is:

1. A brewer's spent grain (BSG) grinder comprising:
   a charging tank fitted with a BSG moistening device;
   a grinding unit connected to the charging tank, the grinding unit having an outlet for discharging grinded BSG, the grinding unit comprising a stator and a rotor located coaxially with a gap defined between respective working surfaces of the stator and the rotor;
   a device for mixing and moving a mixture into the gap between the stator and the rotor, the device being fixed on a central part of an upper side of the rotor, the upper side of the rotor defining an upper end surface of the rotor; and
   a device for discharging grinded BSG located under the rotor;
   wherein the rotor is configured to allow staged grinding of BSG to obtain coarser fraction of BSG at an upper stage of the rotor and finer fraction of BSG at a lower stage of the rotor, the rotor comprising an upper part that is fitted with blades located around a circumference of the rotor, an outer surface of each blade being part of the working surface of the rotor.

2. The BSG grinder of claim 1, wherein the stator is fixed, and the rotor is movable.

3. The BSG grinder of claim 1, wherein the stator and the rotor are made in the form of truncated cones in a longitudinal cross-sectional plane passing through a common axis of the stator and the rotor.

4. The BSG grinder of claim 1, wherein the rotor is capable of three-stage grinding of BSG.

5. The BSG grinder of claim 1, wherein each blade has a first end having a bevel extending from the outer surface of the blade, and a second end having a bevel extending from an inner surface of the blade, the bevels at the first and second ends of the blade ensuring BSG flow into the gap between the rotor and the stator.

6. The BSG grinder of claim 1, wherein the blades include two blades located around the circumference of the rotor opposite to each other.

7. The BSG grinder of claim 1, wherein the working surface of the rotor is made with decrease in width and increase in a number of grooves from the upper stage to the lower stage.

8. The BSG grinder of claim 1, wherein:
the BSG moistening device is implemented as a circular pipeline located in an upper part of the charging tank and is equipped with holes or nozzles for liquid feeding; and
the BSG moistening device is configured to monitor and control an amount of liquid being fed.

9. The BSG grinder of claim 1, wherein the device for mixing and moving the mixture into the gap between the stator and the rotor is a V-shaped or Y-shaped blade.

10. The BSG grinder of claim 9, wherein a cavity is defined on a side of an inlet of the grinding unit, the cavity being limited on a lower side thereof by the upper end surface of the rotor, and the V-shaped or Y-shaped blade has a height of up to half of a height of the cavity.

11. The BSG grinder of claim 1, further comprising:
level sensors for sensing a charging level of the BSG, the level sensors being located in the charging tank; and
a controller connected to the level sensors.

12. The BSG grinder of claim 1, wherein the BSG grinder is capable of grinding BSG to a particle size of 0.001-5 mm.

13. The BSG grinder of claim 1, wherein the outlet for discharging grinded BSG from the grinding unit has a hole width equal to 8-10% of an outer circumference of the stator.

14. The BSG grinder of claim 1, wherein the device for discharging grinded BSG is a bladed disk located centered about an axis of the rotor.

15. A production line for producing a product with high protein content of brewer's spent grain (BSG), comprising: a device for loosening and removing mechanical impurities from the BSG; a BSG grinder according to claim 1; an extractor made with capability of separating a mass into a suspension and shell; and a vibration filter configured to be capable of separating shell particles from the suspension.

16. The production line of claim 15, wherein the BSG grinder is configured to be capable of grinding the mass to a particle size of 0.001-5 mm.

17. The production line of claim 15, wherein the extractor is configured to be capable of separating the mass with a particle size of 0.001-1.0 mm from larger particles.

18. The production line of claim 15, wherein the vibration filter has a filter mesh size of 0.1-0.5 mm.

19. The production line of claim 15, wherein:
the device for loosening and removing mechanical impurities from the BSG is a vibration screen comprising a magnetic trap; and
the vibration screen is made with a mesh size of 6-10 mm, the vibration screen being vibrated at a vibration frequency ranging from 10 to 50 Hz, and an amplitude of 2-20 mm.

20. The production line of claim 15, further comprising a protein suspension concentration device having a concentrate outlet and a centrate outlet,
wherein the centrate outlet of the protein suspension concentration device is connected to the BSG grinder in order to moisten the BSG before grinding.

* * * * *